(12) United States Patent
Fu et al.

(10) Patent No.: US 7,020,800 B2
(45) Date of Patent: Mar. 28, 2006

(54) SYSTEM AND METHOD FOR MEMORY FAILURE RECOVERY USING LOCKSTEP PROCESSES

(75) Inventors: Guangrui Fu, Palo Alto, CA (US); Alan Messer, Sunnyvale, CA (US); Dejan S. Milojicic, Palo Alto, CA (US); Philippe Bernadat, Varces (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 530 days.

(21) Appl. No.: 10/057,124

(22) Filed: Jan. 24, 2002

(65) Prior Publication Data

US 2003/0140281 A1 Jul. 24, 2003

(51) Int. Cl.
*G06F 11/00* (2006.01)

(52) U.S. Cl. ...................................................... 714/38
(58) Field of Classification Search .................. 714/29, 714/28, 6, 8, 12, 13
See application file for complete search history.

(56) References Cited

U.S. PATENT DOCUMENTS

| | | | | |
|---|---|---|---|---|
| 6,195,760 B1 * | 2/2001 | Chung et al. | .................. | 714/4 |
| 6,247,143 B1 * | 6/2001 | Williams | ..................... | 714/11 |
| 6,263,452 B1 * | 7/2001 | Jewett et al. | .................. | 714/9 |
| 6,684,346 B1 * | 1/2004 | Tu et al. | ....................... | 714/11 |
| 6,684,396 B1 * | 1/2004 | Brittain et al. | .............. | 717/168 |
| 6,725,366 B1 * | 4/2004 | Swanberg | .................... | 712/233 |
| 2003/0061530 A1 * | 3/2003 | Hayden | ......................... | 714/6 |

OTHER PUBLICATIONS

Microsoft Computer Dictionalry, Fifth Ed., Microsoft Press, 2002. pp. 140 and 378.*
Thomas C. Bressoud and Fred B. Schneider: "Hypervisor-Based Fault-Tolerance" Dec. 1995, pp. 1-11 SIGOPS '95.

* cited by examiner

*Primary Examiner*—Robert Beausoliel
*Assistant Examiner*—Timothy M. Bonura (57) ABSTRACT

A system and method for memory failure recovery is disclosed. The method discloses the steps of maintaining a predetermined number of duplicate and primary processes; keeping the processes in synchronization; managing the processes so that a single process image is presented to an external environment; detecting a computer system exception which affects one of the processes; and terminating the affected process. The system discloses, a primary process memory space which hosts a primary process; a duplicate process memory space which hosts a duplicate process corresponding to the primary process; a synchronization buffer which keeps the duplicate process in synchronization with the primary process; a processor which generates an exception signal in response to detection of a memory failure condition which affects the primary process; and an operating system which receives the exception signal, terminates the affected primary process, and maintains a predetermined number of primary and duplicate processes.

29 Claims, 7 Drawing Sheets

SYSTEM AND METHOD FOR MEMORY FAILURE RECOVERY USING LOCKSTEP PROCESSES

BACKGROUND OF THE INVENTION

1. Field of the Invention

The present invention relates generally to systems and methods for memory failure recovery, and more particularly to memory failure recovery using lock-step processes.

2. Discussion of Background Art

Memory Failure Recovery (MFR) describes an area within the general field of fault tolerant computer systems. Fault-tolerant computer systems or components incorporate backup hardware and/or software which are designed to be quickly brought on-line upon failure of primary hardware and software elements with minimal loss of service. Well known manufacturers of fault-tolerant systems and components include Compaq's Non-Stop product line, Marathon Technologies, and Stratus Computer.

Fault-tolerant techniques include periodically "checkpointing" critical data, duplexing selected hardware components, such as the microprocessors, mirroring disks, and "lock-stepping" multiple processors together. When a failure occurs, ideally the fault-tolerant system repairs itself often without even interrupting internal processes or computer users.

MFR techniques also include fault-tolerant systems for recovering from memory hardware errors. Three kinds of memory hardware errors exist: design errors, hard errors, and soft errors. Repair techniques for design and hard errors are almost always fatal unless protected against, and are typically limited to either refining the hardware's design or replacing an actual hardware component which failed. However, as design techniques and hardware reliability have improved, design and hard errors have become a dwindling portion of memory hardware errors.

Instead, in matured and refined hardware systems soft errors are a growing and often the highest percentage of all three types of memory hardware errors. Soft errors occur on well designed and reliable hardware which has been affected by one or more unpredictable events in the operating environment. As examples, background radiation and cosmic rays can randomly and unpredictably interfere with memory hardware operation and/or corrupt data stored therein.

Soft errors are a pointedly serious problem in low-profit margin Commodity Off The Shelf (COTS) systems. Such systems typically have very minimal, if any, hardware redundancy and/or error detection and correction systems, even though they are becoming ubiquitous tools within the office and home.

Mass marketed systems have two simple forms of support for memory soft errors. For several years memory systems have been available for commodity systems using parity or Error Correction Codes (ECC) to detect the presence of errors in memory and correct single bit errors. On error, systems either bring themselves to an abrupt halt or cause a severe signal in the processor. Low-cost processors, such as an Intel IA-32 and IA-64 processors, now contain this signaling support which is called a Machine Check Abort (MCA) exception. On the detection of an error, this severe error typically leads to a system halt performed by the operating system. Error correction codes are effective for detecting errors and correcting the simplest errors, however, the fore mentioned system does not cater for recovery from errors when they do occur and cannot be corrected in hardware.

Figure 1:
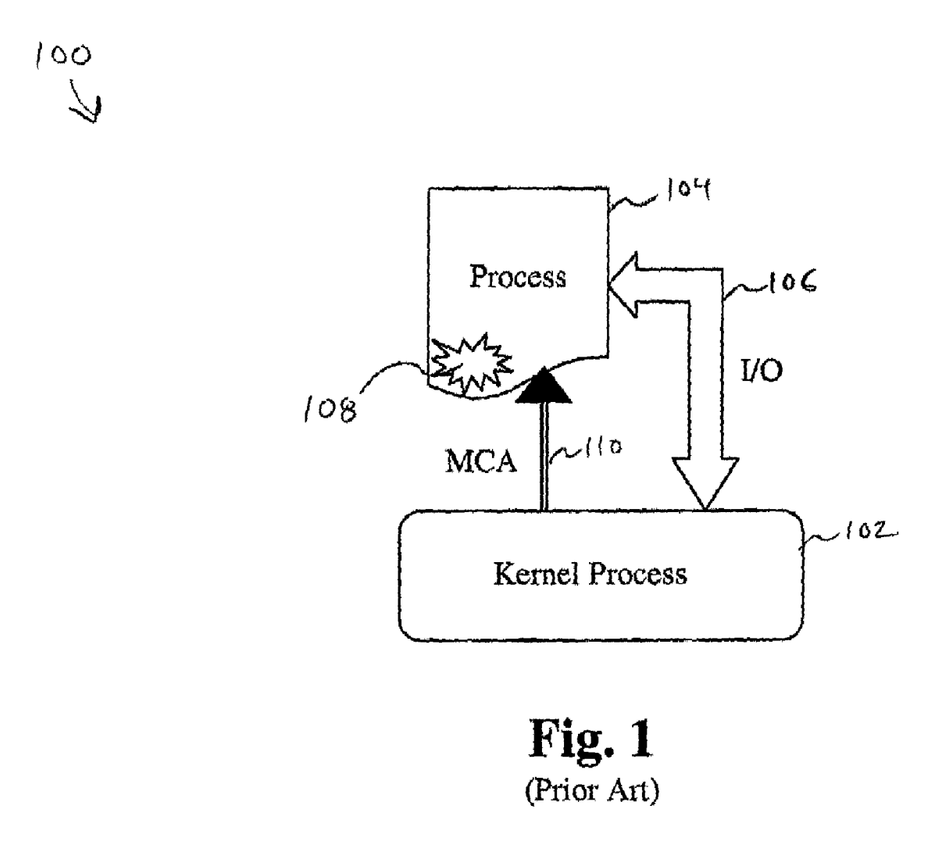
FIG. 1 is a data-flow diagram of memory failure within a Commodity Off The Shelf (COTS) computer system.

FIG. 1 is a data-flow diagram of memory failure within such a IA-64 COTS computer system 100. A typical IA-64 computer system 100 includes a kernel process 102 in communication with a large number of other computer processes, such as process 104, over an input-output (I/O) channel 106. In response to a soft memory error 108 which corrupts process 104, the kernel 102 generates an MCA signal 110 which typically requires that process 104 be terminated. If process 104 served an application or some other top-level program, or utility, such programs or utilities will then terminate, perhaps resulting in a substantial loss of important data which had not yet been saved. Even worse, process 104 could have been a key operating system process which causes a system crash, requiring that the whole computer be rebooted. Such a drastic action not only results in a loss of important data and perhaps termination of network communications, but also results in a significant loss of time to the computer's 100 users, who must not only reboot the computer, but also bring up the application programs again and perhaps re-enter data.

Lock-step processors, mentioned above, are one approach toward implementing fault-tolerant computing systems which can perhaps recover from some design and hard errors. Lock-step processors are found within Compaq Himalayas Non-Stop Series of computers and IBM's S/390 computer series. Lock-step processor systems include two hardware processors strictly synchronized cycle-by-cycle. They execute exactly the same instruction each cycle. Lock-step systems also include a substantial amount of internal circuitry inside each of the processors for internally checking that the two lock-stepped processors are indeed operating consistently. Lock-step processors, however, are still vulnerable to memory hard and soft errors since the two processors share memory resources. Thus, if the shared memory fails, the lock-step processors will not be able to recover and the computer must be rebooted. Even further, lock-step processor systems are very expensive, since duplication of very expensive and necessarily complex circuitry is required.

Another approach toward fault-tolerant computing employs fail-over clusters. A fail-over cluster consists of at least two interconnected nodes/computers. The two nodes rely on intercommunication of shared data for recovery support. During normal operation, the two nodes share a predetermined portion of all processing tasks. Upon failure of one of the nodes, however, the other node assumes responsibility for all processing tasks. Such clusters also suffer from the same cost and complexity limitations, due to the node duplication required. Furthermore, upon a failure condition in such clusters, all processing tasks are switched over to the other node/computer, which may not always be a desirable situation due to the high load.

As a final example, Cornell University has developed a fault-tolerant computing technique based on "Hyper-Visors." A Hyper-Visor is a software virtual machine that is instantiated between a computer's processor and the computer's operating system, and gives the illusion of multiple processors on one processor. In a typical fault-tolerant Hyper-Visor implementation, the processor hosting a copy of the Hyper-Visor, is part of a complete system, but the Hyper-Visor gives the illusion of multiple processors sharing the rest of the system. The Hyper-Visor implements two or more processors, each of which is able to run its own operating system, application program, and utility processes. During normal operation, only the first virtual processor interacts with system software and resources. Upon a failure on the first virtual processor, however, the backup virtual processor takes over and processing continues. Like the fail-over cluster technique, all application jobs are switched over to the other Hyper-Visor processor. However, since virtual processors are sharing resources, such as memory and disks, errors in these may affect both virtual machines. Lastly, virtual machines must present a fault isolation boundary to be effective for fail-over support. Unfortunately, this requires hardware support for the virtual machine monitor and critical system errors such as memory errors may not be isolatable.

In response to the concerns discussed above, what is needed is a system and method for memory failure recovery that overcomes the problems of the prior art.

SUMMARY OF THE INVENTION

The present invention is a system and method for memory failure recovery using lock-step processes. The method of the present invention includes the steps of maintaining a predetermined number of duplicate and primary processes; keeping the processes in synchronization; managing the processes so that a single process image is presented to an external environment; detecting a computer system exception which affects one of the processes; and terminating the affected process.

Within the system of the present invention, a primary process memory space hosts a primary process; a duplicate process memory space hosts a duplicate process corresponding to the primary process; a synchronization buffer keeps the duplicate process in synchronization with the primary process; a processor generates an exception signal in response to detection of a memory failure condition which affects the primary process; and an operating system receives the exception signal, terminates the affected primary process, and maintains a predetermined number of primary and duplicate processes.

The system and method of the present invention are particularly advantageous over the prior art because the present invention enables dynamic fault-tolerance adjustment without added hardware expense and can be implemented in standard Commodity Off The Shelf (COTS) systems.

These and other aspects of the invention will be recognized by those skilled in the art upon review of the detailed description, drawings, and claims set forth below.

DETAILED DESCRIPTION OF THE PREFERRED EMBODIMENT

Figure 2:
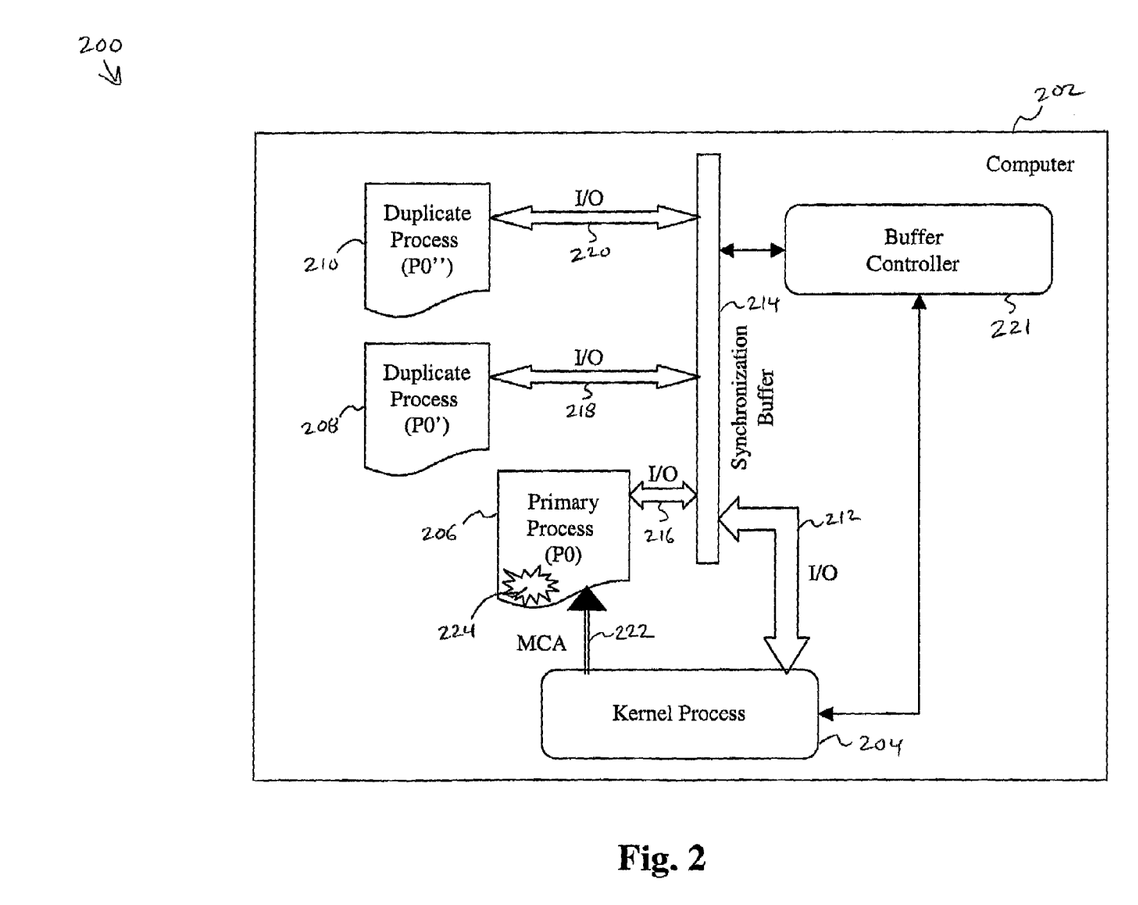
FIG. 2 is a data-flow diagram of a first embodiment of a system for lock-step process memory failure recovery within a computer.
Figure 3:
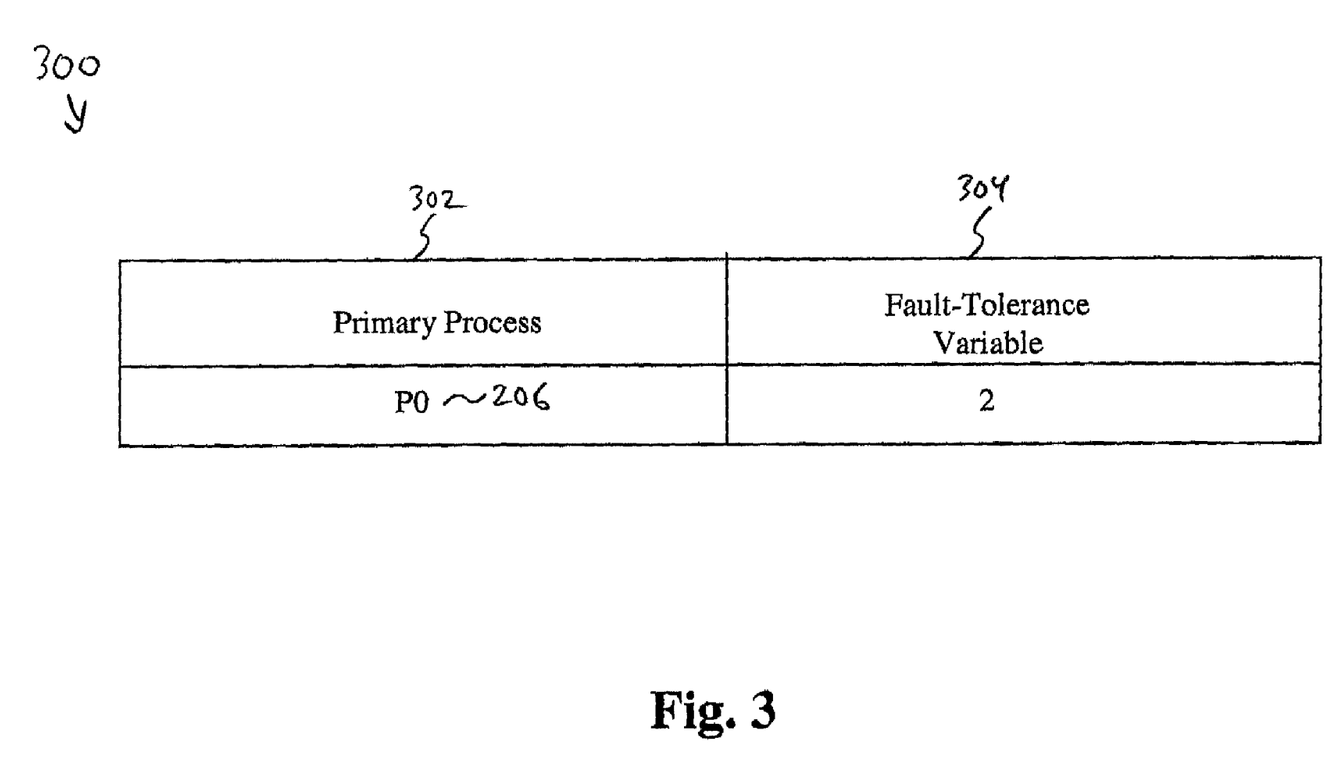
FIG. 3 is a fault-tolerance level data structure for dynamically specifying a fault-tolerance level for primary computer processes operating within the computer.
Figure 4A:
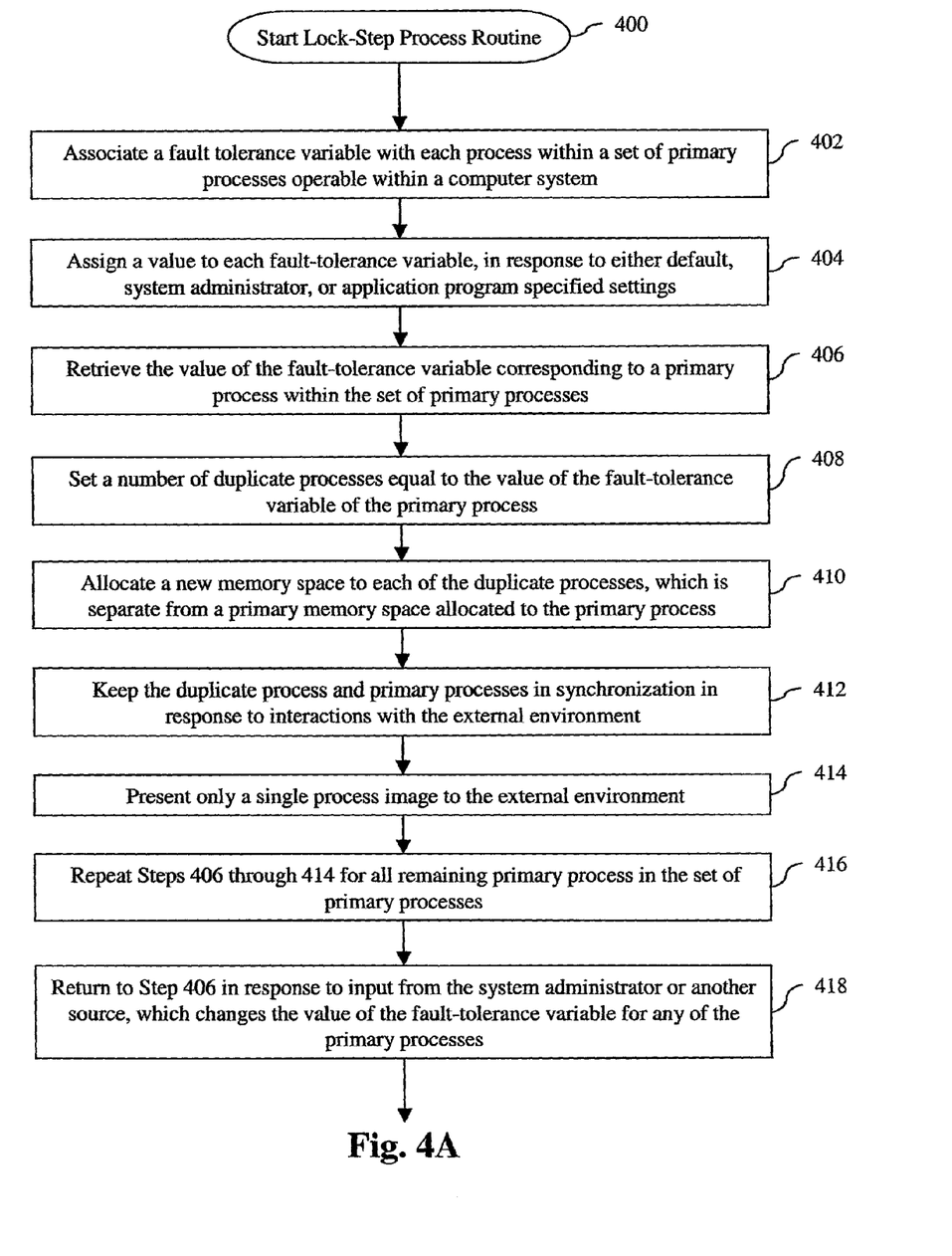
FIGS. 4A & 4B together are a method for lock-step process memory failure recovery.
Figure 4B:
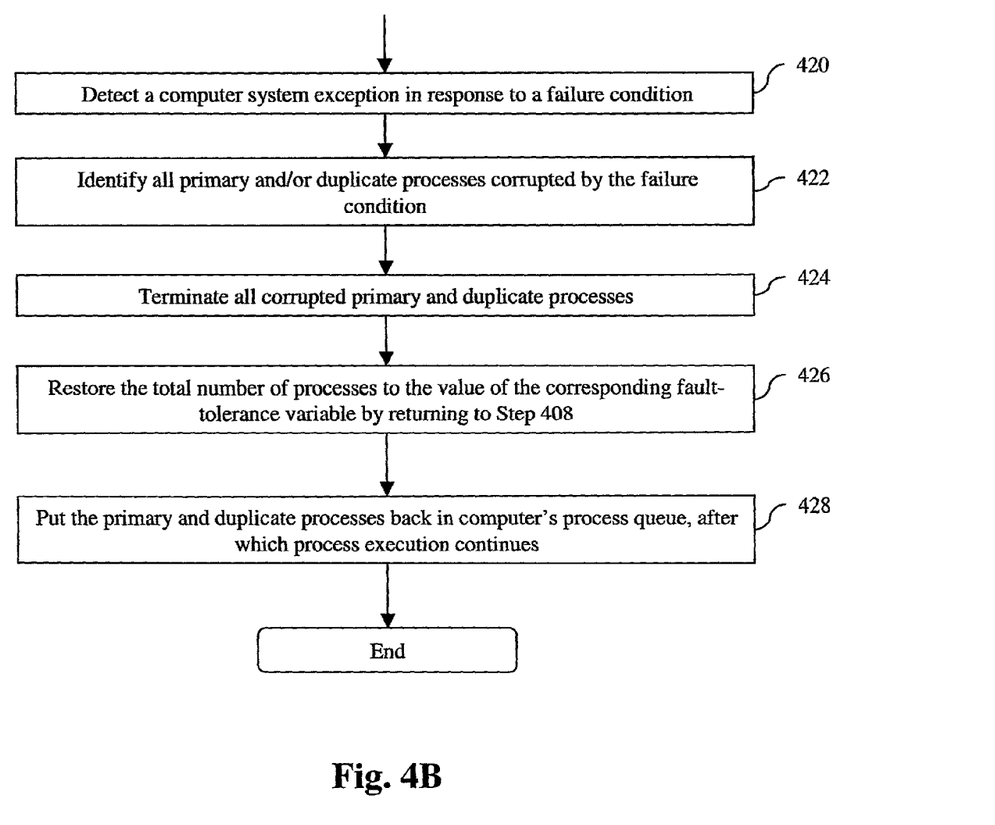

FIG. 2 is a data-flow diagram of a first embodiment of a system 200 for lock-step process memory failure recovery within a computer 202. FIG. 3 is a fault-tolerance level data structure 300 for dynamically specifying a fault-tolerance level for primary computer processes 302 operating within the computer 202. FIGS. 4A & 4B together are a method 400 for lock-step process memory failure recovery. FIGS. 2, 3 and 4 are discussed together.

The computer 202 is under control of an Operating System (OS), which includes a kernel process 204. The computer 202 also hosts a large number of processes (not shown) which provide services to the operating system, application programs, computer utilities, and almost all other computer functionality.

The method 400 begins in step 402 the OS associates a fault tolerance variable with each process within a set of primary processes operable within the computer 202. The set of primary processes includes those processes which are currently identified by the operating system as in an active state and in service of computer system functionality. The primary processes also includes those that will be created when an application program is launched. Computer system functionality which is external to such processes is herein defined as the processes's environment. The primary processes may be either parent or child processes.

The system 200 shows only one primary process P0 206 for the purposes of this discussion; however, in a typical implementation of the present invention there will likely be hundreds of primary processes which are active at any one time.

Next, in step 404 values are assigned to each fault-tolerance variable 304, in response to either predetermined default values, dynamically specified system administrator selected values, or application program specified values which are stored in the fault-tolerance level data structure 300 of FIG. 3. For example, with respect to system 200, the primary process P0 206 has the value of its fault tolerance variable 304 set to "2".

In step 406, the OS retrieves the value of the fault-tolerance variable 304 corresponding to a primary process within the set of primary processes 302. Next in step 408, the OS sets a number of duplicate processes equal to the value of the fault-tolerance variable 304 of the primary process. The setting process in step 408 may result in the creation of new duplicate process, the termination of an excessive number of duplicate processes, or maintenance of a current number of duplicate processes, depending upon the current value of the fault-tolerance variable 304 and how many duplicate processes currently exist. Preferably, new duplicate processes are created immediately after corresponding primary processes are created. In system 200, since the value of the fault tolerance variable 304 is "2" for primary process 206, the OS creates two duplicate processes P0' 208 and P0" 210.

Also since different fault-tolerance values may be assigned to either parent or child primary processes, some implementations of the present invention may have a parent primary process with only one duplicate, but a corresponding child primary process with three or more duplicates. Alternatively, the child primary processes can have fewer duplicate processes than a corresponding parent primary process.

In step 410, the OS allocates a new memory space within the computer's 202 memory hardware (not shown) to each of the duplicate processes. The new memory space is preferably separate from a primary memory space allocated to the primary process. By keeping the primary and duplicate process memory spaces separate the present invention protects a computer from memory failure errors occurring in the memory space allocated to the primary process. Thus in system 200, primary process P0 206 has its own dedicated memory space, and duplicate processes P0' 208 and P0" 210 each have their own separate memory spaces respectively. By increasing the number of duplicate processes, a systems administrator can protect the computer 202 from any number of simultaneous soft memory errors, depending upon how critical the corresponding primary process is to either OS, application program, or utility program functioning.

For example, if the computer 202 functioned as a server on a network, a systems administrator may specify multiple duplicate processes for all computer 202 primary processes. Wherein, if the computer 202 functions as a stand alone system, perhaps the systems administrator or a user would create duplicate processes only for the OS or certain key application programs.

The system 200 includes a synchronization buffer 214 through which the primary process P0 206 and the duplicate processes P0' 208 and P0" 210 maintain communication with the kernel process 204 and thus the external environment. All these processes are linked to the synchronization buffer 214 though I/O channels 212, 216, 218, and 220 as shown. The synchronization buffer 214 is under control of a buffer controller 221. The buffer controller 221 permits both the primary and duplicate processes to receive data or signals from the external environment. In this way, as noted in step 412, the duplicate and primary processes are kept in synchronization in response to interactions with the external environment.

In contrast however, the buffer controller 221 preferably permits only one of the processes 206, 208 or 210 to transmit a response, such as commands, system calls, library calls and the like, out of the synchronization buffer 214 over I/O channel 212 back to the external environment. All other responses from the other processes 206, 208, or 210 are masked within the synchronization buffer 214 by the buffer controller 221 and thus are not transmitted back to the kernel process 204 over I/O channel 212. Many different process selection criteria may be used to determine which of the processes 206, 208, or 210 is permitted to respond. Preferably the process which responds most quickly is permitted to respond.

However, the processes are also synchronized when one of the processes transmits a response. Thus in a preferred embodiment of the present invention, both the primary and duplicate processes operate in a loosely-coupled lock-step. Loosely-coupled means herein that the primary and duplicate processes are preferably synchronized only upon receipt of data or signals from the external environment, or when commands, system calls, library calls and the like are sent to the external environment.

Those skilled in the art however, will recognize that other systems and methods for keeping the duplicate processes in synchronization with the primary process may also be employed. In fact, an exact method by which the processes are kept in synchronization is preferably left to the discretion of the systems administrator presiding over a particular implementation of the present invention. Such alternative synchronization methods may be based on timing concerns, such as to minimize processor time spent performing synchronization, or based on synchronization overhead concerns, such as by looking for windows of relative processor inactivity during which to perform synchronization.

In this way, as noted in step 414, only a single process image is presented to the external environment. The masked out primary and/or duplicate processes can thus be thought of as black-boxes during normal system 200 operation.

In step 416, steps 406 through 414 are repeated for all remaining primary process in the set of primary processes. Next in step 418, the method 400 returns to step 406 in response to input from the system administrator or another source, which changes the value of the fault-tolerance variable 304 for any process in the set of primary processes.

Thus, the present invention along with the fault-tolerance level data structure 300 gives users and systems administrators an ability to, dynamically or by default, assign a unique fault-tolerance level (a.k.a. a High Availability (HA) level) to each and every primary process operating on a computer system. The present invention and data structure 300 also permit fault-tolerance levels to be modified during computer 200 operation without having to terminate application programs or reboot the computer 200. Thus for example, if the system administrator observes that memory errors tend to be less frequent in the kernel process's 204 memory space when compared with a memory space allocated to a user application program, the system administrator can merely change the value of the fault-tolerance variable 304 for certain processes servicing the user application program. The present invention's fault-tolerance technique is thus much more flexible and requires less complex hardware than prior art techniques.

While preceding paragraphs have discussed how preparation for the present invention's system and method for memory failure recovery using lock-step processes is implemented, the paragraphs to follow discuss how the system and method responds to an actual memory failure condition.

In step 420, the OS has just detected a computer system exception in response to some sort of failure condition. The failure condition may be of any type which affects operation of one or more primary or duplicate processes within the computer 202. While memory failures are contemplated as a main source for such exceptions, other non-memory failure conditions may also corrupt one or more processes. Detection may occur in any number of ways, one of which is shown in FIG. 2, whereby a computer processor (not shown), hosting the kernel and other processes, generates a Machine Check Abort (MCA) exception signal 222, upon detection of a fatal hardware error, which can not be corrected by either hardware or firmware.

Next in step 422, the OS identifies all primary and/or duplicate processes corrupted by the failure condition. In the system 200 example, only primary process P0 206 has affected by a failure condition 224. In response to the failure condition, all corrupted primary and duplicate processes are terminated in step 424. Thus in the example only primary process P0 206 is terminated.

Since the synchronization buffer 214 presents the external environment with a single "process image" and duplicate processes 208 and 210 can still respond to the external environment, termination of the primary process 206 is not detectable by the external environment, and thus application programs, computer system utilities or other computer functionality relying upon the terminated primary process need not be shut down and/or rebooted in response to the failure condition.

In step 426, the OS restores the total number of processes to the value of the corresponding fault-tolerance variable by returning to Step 408. And, in step 428, the OS puts the primary and duplicate processes back in computer's process queue, after which process execution continues as if the failure-condition never occurred. After step 430 the method ends.

Figure 5:
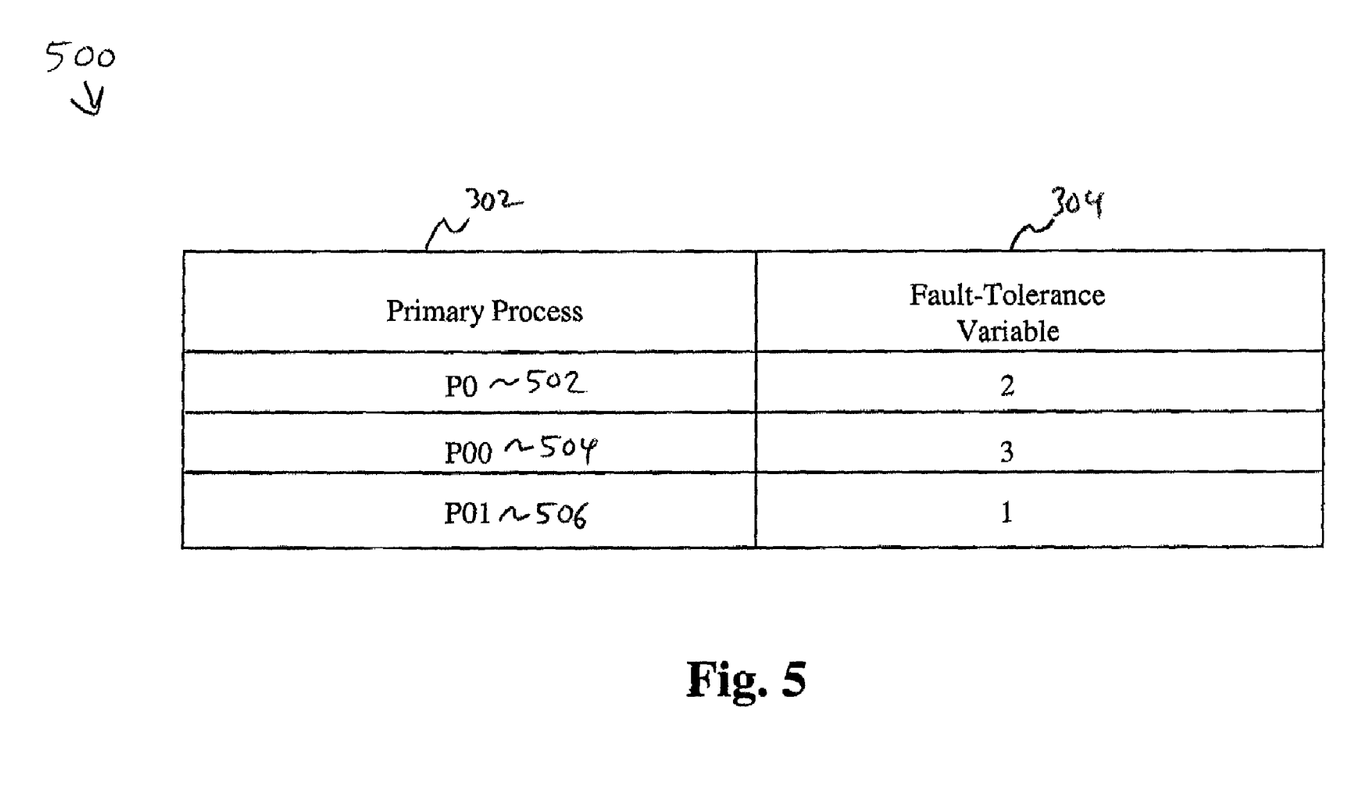
FIG. 5 shows a second fault-tolerance level data structure for a second embodiment of the system.
Figure 6:
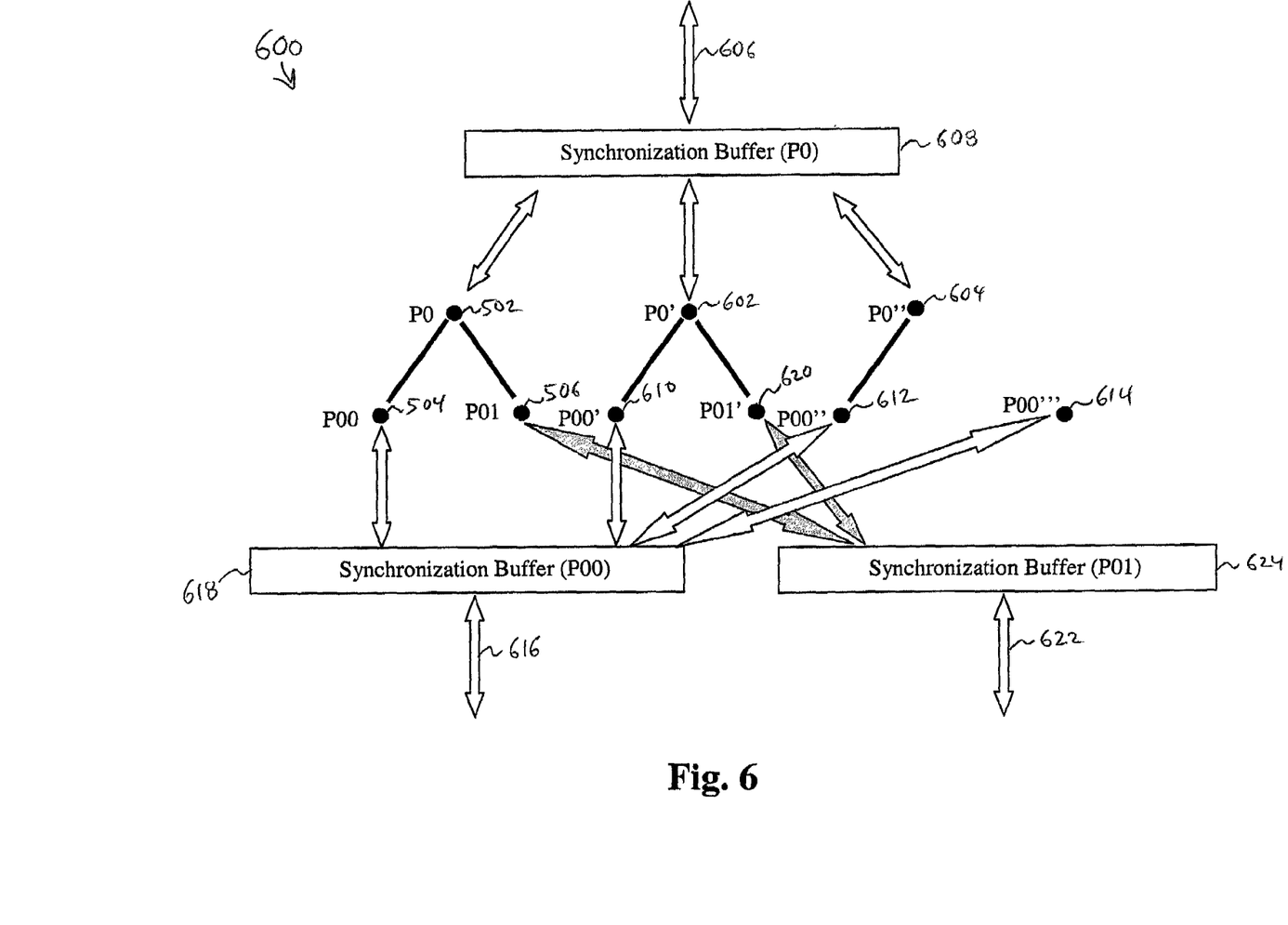
FIG. 6 is a data-flow diagram showing the second embodiment of the system.

FIG. 5 shows a second fault-tolerance level data structure 500 for a second embodiment of the system 200, and FIG. 6 is a data-flow diagram 600 showing the second embodiment of the system 200. FIGS. 5 and 6 are discussed together.

The second fault-tolerance level data structure 500 identifies three primary processes 302 and values for their corresponding fault-tolerance variables 304. The processes include: a primary parent process P0 502 having the value of its fault tolerance variable set to "2", a primary child process P00 504 having the value of its fault tolerance variable set to "3", and a primary child process P01 506 having the value of its fault tolerance variable set to "1".

As shown by the second data structure 500, child processes may have their fault-tolerance variable 304 set to a value different than their corresponding parent processes. For example, a primary parent process with one duplicate may have a primary child process having no duplicates. Thus the duplicate parent process will be kept in synchronization with the primary parent process while the primary child process will have no duplicate process to be kept in sync with. Alternatively, a primary parent process with one duplicate can have a primary child process with two duplicates.

Data-flow diagram 600 shows how duplicate processes corresponding to primary parent and child processes P0 502, P00 504, and P01 506 are kept in synchronization. Two duplicate parent processes P0' 602 and P0" 604 have been created by the OS to backup primary parent process P0 502, since the value of primary parent process's P0 502 fault-tolerance variable was set to "2". Duplicate processes P0' 602 and P0" 604 of primary parent process P0 502 are kept in synchronization by routing all external communications sent and/or received over I/O channel 606 through synchronization buffer (P0) 608 in the same way as discussed with respect to FIG. 2.

Similarly, three duplicate child processes P00' 610, P00" 612, and P00'" 614 have been created by the OS to backup primary child process P00 504, since the value of primary child process's P00 504 fault-tolerance variable was set to "3". Duplicate processes P00' 610, P00" 612, and P00'" 614 of primary child process P00 504 are kept in synchronization by routing all external communications sent and/or received over I/O channel 616 through synchronization buffer (P00) 618.

And lastly, only one duplicate child process P01' 620 has been created by the OS to backup primary child process P01 506, since primary child process's P01 506 fault-tolerance variable was set to "1". Duplicate process P01' 620 of primary child process P01 506 is kept in synchronization by routing all external communications sent and/or received over I/O channel 622 through synchronization buffer (P01) 624.

As mentioned above, those skilled in the art will recognize however that synchronization can be performed in many other ways and using different hardware than shown as well.

While one or more embodiments of the present invention have been described, those skilled in the art will recognize that various modifications may be made. Variations upon and modifications to these embodiments are provided by the present invention, which is limited only by the following claims.

What is claimed is:

1. A method for memory failure recovery in a computer, comprising:
   maintaining a predetermined number of duplicate and primary processes in the computer;
   keeping the processes in synchronization;
   managing the processes so that a single process image is presented to an external environment;
   detecting a computer exception which affects one of the processes; and
   terminating the affected process.

2. The method of claim 1 wherein the detecting element includes detecting a memory failure.

3. The method of claim 1 further comprising:
   allocating a new memory space in memory hardware in the computer to each of the duplicate processes, which is separate from a memory space in the memory hardware allocated to the primary process.

4. The method of claim 1 wherein the maintaining element includes:
   identifying a primary process;
   monitoring a fault-tolerance value corresponding to the primary process; and
   setting a number of duplicate processes equal to the fault-tolerance value.

5. The method of claim 4 further comprising assigning a predetermined fault-tolerance value to a primary process.

6. The method of claim 4 further comprising dynamically modifying the fault-tolerance value of the primary process, in response to a computer command.

7. The method of claim 4 wherein the setting element includes adding one or more new duplicate processes, if the number of duplicate processes is less than the fault-tolerance value.

8. The method of claim 4 wherein the setting element includes deleting a duplicate process, if the number of duplicate processes is more than the fault-tolerance value.

9. The method of claim 1 wherein the keeping element includes synchronizing the processes upon receipt of data from an external environment.

10. The method of claim 1 wherein the keeping element includes synchronizing the processes upon receipt of signals from an external environment.

11. The method of claim 1 wherein the keeping element includes synchronizing the processes upon transmission by one of the processes to an external environment.

12. The method of claim 1 wherein the managing element includes permitting only one of the processes to transmit to an external environment.

13. The method of claim 1 wherein the managing element includes permitting only one of the processes to perform a system call to an external environment.

14. The method of claim 1 wherein the managing element includes permitting only one of the processes to perform a library call to an external environment.

15. The method of claim 1, further comprising:
   the processes communicating, through a synchronization buffer, with an external environment,
   wherein keeping the processes in synchronization is based on interaction between the processes and the external environment through the synchronization buffer.

16. A method for memory failure recovery, comprising:
   maintaining a predetermined number of duplicate and primary processes;
   keeping the processes in synchronization;
   managing the processes so that a single process image is presented to an external environment;

detecting a computer system exception which affects one of the processes; and terminating the affected process;

wherein the maintaining element includes,
identifying a primary process;
monitoring a fault-tolerance value corresponding to the primary process; and
setting a number of duplicate processes equal to the fault-tolerance value; and wherein the managing element includes,
permitting only one of the processes to perform a system call to an external environment.

17. The method of claim 16, wherein keeping the processes in synchronization is based on data or signals received from the external environment, the external environment including computer functionality outside the processes.

18. The method of claim 16, wherein the predetermined number of duplicate and primary processes are maintained in a computer.

19. A computer-usable medium embodying computer program code for commanding a computer to perform memory failure recovery comprising:

maintaining a predetermined number of duplicate and primary processes in the computer;

keeping the processes in synchronization;

managing the processes so that a single process image is presented to an external environment;

detecting a computer system exception which affects one of the processes; and terminating the affected process.

20. The medium of claim 19 wherein the detecting element includes detecting a memory failure.

21. The medium of claim 19 further comprising:

allocating a new memory space in memory hardware in the computer to each of the duplicate processes, which is separate from a memory space in the memory hardware allocated to the primary process.

22. The medium of claim 19 wherein the maintaining element includes:

identifying a primary process;

monitoring a fault-tolerance value corresponding to the primary process; and setting a number of duplicate processes equal to the fault-tolerance value.

23. The medium of claim 19 wherein the managing element includes permitting only one of the processes to transmit to an external environment.

24. The medium of claim 19, wherein the computer program code is for commanding the computer to further perform:

enabling the processes to communicate, through a synchronization buffer, with an external environment, wherein keeping the processes in synchronization is based on interaction between the processes and the external environment through the synchronization buffer.

25. A system for memory failure recovery in a computer, comprising:

means for maintaining a predetermined number of duplicate and primary processes in the computer;

means for keeping the processes in synchronization;

means for managing the processes so that a single process image is presented to an external environment;

means for detecting a computer exception which affects one of the processes; and means for terminating the affected process.

26. A system for memory failure recovery, comprising:

a primary process memory space hosting a primary process;

a duplicate process memory space hosting a duplicate process corresponding to the primary process;

a synchronization buffer for keeping the duplicate process in synchronization with the primary process;

a processor for generating an exception signal in response to detection of a memory failure condition which affects the primary process; and an operating system for receiving the exception signal, terminating the affected primary process, and maintaining a predetermined number of primary and duplicate processes.

27. The system of claim 26, further comprising:

a buffer controller for permitting the processes to receive communications from an external environment while permitting only one of the processes to transmit to the external environment.

28. The system of claim 26, wherein the exception signal is a machine check abort signal.

29. The system of claim 26, wherein the primary process, duplicate process, synchronization buffer, processor, and operating system are part of a computer.

* * * * *